United States Patent [19]

Sundberg et al.

[11] 4,153,760
[45] May 8, 1979

[54] MICROPOROUS PLASTIC MEMBER SUCH AS A BATTERY SEPARATOR AND PROCESS FOR MAKING SAME

[75] Inventors: Erik G. Sundberg, Osbacken, Sweden; George A. Campbell, Newfoundland, N.J.; Edward I. Doucette, Hollywood, Calif.

[73] Assignee: Aktiebolaget Tudor, Sweden

[21] Appl. No.: 514,628

[22] Filed: Oct. 15, 1974

Related U.S. Application Data

[63] Continuation of Ser. No. 83,142, Oct. 22, 1970, abandoned, which is a continuation-in-part of Ser. No. 661,539, Aug. 18, 1967, abandoned.

[30] Foreign Application Priority Data

Sep. 1, 1966 [SE] Sweden ............... 11747/66

[51] Int. Cl.$^2$ ............... H01M 2/16; B29H 7/20; C04B 33/32
[52] U.S. Cl. ............... 429/252; 264/45.3; 264/46.1; 264/49; 264/177 R; 264/211; 264/DIG. 17
[58] Field of Search ............... 136/146, 148; 264/49, 264/45.3, 46.1, 177, 211, DIG. 17; 429/252

[56] References Cited

U.S. PATENT DOCUMENTS

| 2,700,694 | 1/1955 | Fernald | 136/146 |
|---|---|---|---|
| 2,707,201 | 4/1955 | Fernald et al. | 264/49 |
| 2,772,322 | 11/1966 | Witt et al. | 136/146 |
| 3,085,292 | 4/1963 | Kindseth | 264/213 |
| 3,351,495 | 11/1967 | Larsen et al. | 136/146 |
| 3,486,946 | 12/1969 | Duddy | 136/146 |

Primary Examiner—Donald L. Walton
Attorney, Agent, or Firm—Burns, Doane, Swecker & Mathis

[57] ABSTRACT

A process for producing a microporous plastic member useful as a battery separator which comprises (a) forming a coherent dough by mixing a vinyl chloride resin with a plasticizing amount of a first solvent and with finely divided particles of a filler which contains volatilizable constituent releasable therefrom by heating and which shrinks substantially and irreversibly upon release of said volatilizable constituent therefrom, an example of which is hydrated silica;

(b) forming the solvent-containing dough into a shaped member;

(c) extracting the first solvent from the member before any substantial evaporation of solvent occurs by contacting it with a second solvent in a liquid bath at a temperature substantially below the boiling point of any liquid present, the second solvent being one which is capable of dissolving the first solvent without dissolving the resin and the filler, thereby deplasticizing the member by extractively removing the first solvent from the member; and (d) thereafter heating the member at an elevated temperature but below the softening point of the resin until the filler is shrunk within the member by release of its volatilizable content.

10 Claims, 2 Drawing Figures

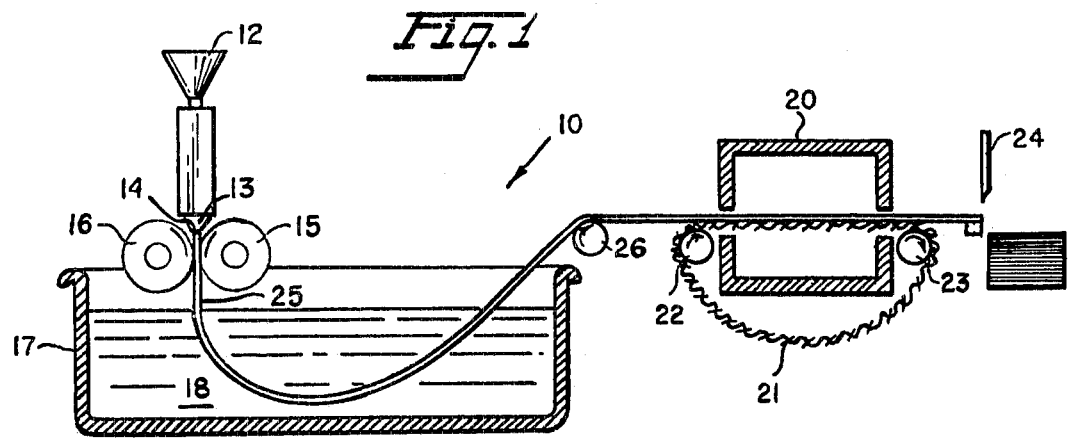
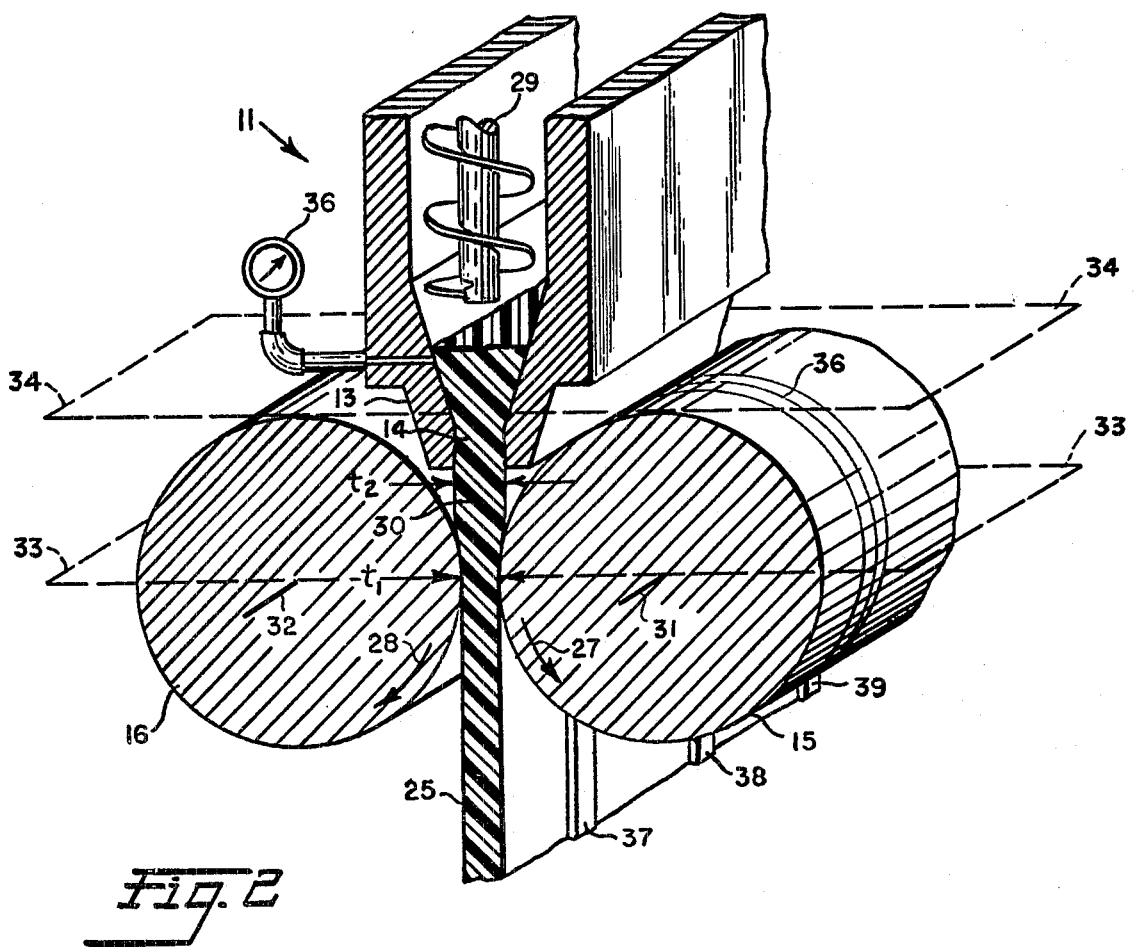

MICROPOROUS PLASTIC MEMBER SUCH AS A BATTERY SEPARATOR AND PROCESS FOR MAKING SAME

RELATED APPICATION

This application is a continuation of Ser. No. 83,142 filed Oct. 22, 1970 which is a continuation-in-part of Ser. No. 661,539 filed Aug. 18, 1967, both abandoned.

BACKGROUND OF THE INVENTION

Numerous attempts have been made to produce plastic separators both reinforced and unreinforced, and many such attempts have been successful to the extent that the separators are commercially available and used within the industry concerned. These separators include blanks of cellulose fibers; for example, paper impreganated with resins insoluble in sulfuric acid or they comprise woven fabrics of polyvinylidene chloride and other plastic fibers. They also include glass fibers alone or in combination with other materials such as diatomaceous earth. These separators have many disadvantages and imperfections, which include porosity that is too low leading to high internal resistance in the battery which is undesirable, and pore size that is sufficiently large to permit shorting between the negative and positive plates or material transfer, such as antimony, which reduces the capacity of the battery.

Other separators in existence consist of unreinforced plastic material. These have preferably been prepared by mixing powdered thermoplastic material with a porous or pore producing material and a solvent to make the plastic processable. After a dough has been made, this is formed by extrusion or calendering into a sheet of suitable thickness and the solvent evaporated. For instance, see Witt et al U.S. Pat. No. 2,772,322. The Witt et al process preferentially uses an evaporative removal of the solvent. This evaporative removal is difficult to accomplish without the aid of elaborate mechanisms to support the dough which, at this point, has little strength. Furthermore, evaporation of the solvent from the surface of the dough causes undesirable distortion of the sheet of dough. If the pore forming material is porous, as in the case of diatomite, the sheet after evaporation need only itself be cut to the desired size and used as a separator. In this case, however, stresses are set up in the plastic structure which cause shrinkage and reduce the effective porosity of the product.

If, on the other hand, the pore forming material consists of a water soluble material such as an inorganic salt or organic material such as starch or sugar, this must be leached from the extruded or calendered sheet and the result is a porous sheet which is then dried. U.S. Pat. No. 3,055,966 describes one such process in which the pore making material consists of an inorganic salt and starch. However, separators, the porosity of which is caused by pore formers that have been leached or washed out, tend to have relatively low residual porosity due to shrinkage during such processing. Also, these separators have poor wetting characteristics which tend to retard passage of electrolyte and thereby cause high internal resistance when assembled in a battery.

A principal object of the present invention is to provide a process for producing a microporous member useful, for example, as a separator for electric storage batteries, with high porosity and good and permanent wetting characteristics, which separator is sufficiently rigid and impact resistant to be inserted by machinery between the battery plates.

Another object is to provide an improved process for producing a microporous member which minimizes the undesirable distortion of the sheet caused by evaporation of the solvent from the sheet.

Further, the separator should have sufficient dimensional stability, mechanical strength, and insolubility so as to maintain its dimensions and characteristics during service in an electric storage battery.

These and other objects of the invention, as well as the nature, operation and use of the invention, will become more fully apparent from the subsequent description and appended claims. All amounts and proportions of materials are expressed herein on a weight basis unless indicated otherwise.

GENERAL DESCRIPTION

In accordance with the present invention, as concisely stated in the Abstract earlier herein, poromeric or microporous plastic sheets are made from a mixture compounded from the following essential kinds of ingredients: (1) a thermoplastic resin, for example, resinous polyvinyl chloride: (2) a solvent which serves to plasticize the resin, e.g., cyclohexanone; and (3) a pore former such as silica hydrogel (which, for instance, may easily hold from 20 up to about 80% water that can be released therefrom by heating and which then irreversibly shrinks in size), or any other carrier or substrate for volatile matter which serves to import a controlled amount of volatile matter into the resinous matrix whence the volatile matter is later removed under controlled conditions leaving behind the desired system of micropores.

Instead of polyvinyl chloride, other similar resilient thermoplastic vinyl resins or polymers of ethylenically unsaturated monomers can be used, e.g., copolymers of about 85 to 97% vinyl chloride and correspondingly 15 to 3% vinyl acetate. The thermoplastic resin must, of course, be a material (1) which can be converted to a doughy, plasticized state with the aid of a solvent, without or with the aid of moderate heat so as to be readily capable of shaping by extrusion or calendering while in this plasticized state, and which then, upon removal of solvent and consequently deplasticization, retains the resulting shape at whatever temperature it is ultimately intended to function; and (2) which is chemically stable under the conditions of intended use, that is, if it is intended to serve as a battery separator it should resist attack by battery acid or the reaction products which can occur in a battery cell, nor should it thermally decompose or become embrittled at temperatures at which batteries are expected to be used and function.

To facilitate mixing or compounding, the resin is preferably used in the form of a powder or fine granules. Commercial vinyl chloride polymer, such as "QYNA" made by Union Carbide Corporation, represents a suitable species of resin. If desired, a coloring agent or filler, such as carbon black, may be included in the composition in conventional proportions, e.g., about ½ to 2 parts per part of thermoplastic resin, the appropriate amount being somewhat dependent on the specific character and proportions of the other ingredients of the mix as well as on the desired working characteristics of the dough and the performance characteristics of the final product.

Instead of silica hydrogel or hydrated silica, in making a sheet of about 0.6 mm. thickness, the pore former can be any other relatively little soluble inorganic or organic solid capable of holding at least 30 parts water or other volatile matter per 100 parts non-volatile material and capable of irreversibly shrinking in volume when such volatile matter is driven off or released upon heating to an appropriate temperature below the decomposition of the thermoplastic resin used in the process. In this manner, dehydration or devolatilization and shrinkage of the filler material in the rigid, deplasticized sheet brings about the formation of the desired system of mocropores within the sheet. Among the more readily available pore forming materials of this kind are aluminum hydroxide, ferrous hydroxide, hydrated adsorbent clays or diatomaceous earths, borax and acetyl salicylic acid.

Of course, the material should be one which is not readily extracted from the extruded or calendered plastic sheet in the solvent removal or deplasticizing bath. Furthermore, when the poromeric product is intended for use as a battery separator, the pore former as well as all the other materials used in its production should be essentially free from components or impurities such as iron, manganese, arsenic, etc., which have an adverse effect on the battery performance.

1 to 25 or more parts by weight, preferably 5 to 12 parts, of the pore forming filler can be used per part of thermoplastic resin. Silica hydrogel containing 70% to 75% water is a particularly convenient material to use. When the releasable volatile content of the filler, and consequently its shrinkage capability, are low, it is often advantageous to use more than 12 parts of filler per part of resin.

The selection and optimum amount of solvent depend on the resin used. For instance, in the case of vinyl chloride polymers, it is convenient to use ketones as solvents, e.g., cyclohexanone, methyl ethyl ketone, tetrahydrofuran or phorone (diisopropylidene acetone). There is nothing particularly critical about the kind or amount of solvent used except that, upon mixing with the resin and the pore former and whatever other ingredients may be present, it should yield a dough of a consitency suitable for molding or extrusion in the form of thin sheets and should not attack the pore former. Moreover, since the solvent must ultimately be extracted from the formed sheet while minimizing its loss by evaporation, it is desirable that it be relatively nonvolatile, e.g., preferably have a boiling point of at least 120° C., and relatively easily extractable with water or some other relatively inexpensive and relatively volatile secondary solvent which does not appreciably solvate the resin or the porous filler used.

Through generally not required when a pore former such as silica hydrogel is used, which in itself facilitates wetting, in some instances the extraction of the plasticizing solvent from the plastic sheet may be facilitated by including a small amount, e.g. 0.001 to 0.1 part of a conventional wetting agent per part of thermoplastic resin in the dough forming mixture. Cationic or anionic emulsifiers can be used, but non-ionics such as sulfonated red oil (a sulfated oleic acid) are particularly effective in decreasing extraction time. When the primary solvent is a ketone, its extraction can also be facilitated by adding a minor proprotion of a $C_1$–$C_3$ alkanol such as methanol, ethanol or isopropyl alcohol to the water used as the extraction medium. When the primary solvent is an aromatic hydrocarbon or an ester, ethanol is a convenient extraction medium.

It is important that when the dough is extruded in the desired shape, such as a sheet, that it be conveyed into the extraction medium under conditions such that a significant amount of the primary solvent or of the volatile content of the pore former does not evaporate from the sheet prior to its immersion in the extraction medium. The extraction medium in the extraction step is desirably maintained at a temperature which is at least nearly the same and is preferably higher than the maximum temperature used in the preceding dough forming and shaping steps.

For instance, if the temperature of the mixture in the dough forming step is raised from room temperature to 50° C. or 70° C. and the dough is extruded or otherwise shaped at about this temperature to form a sheet, the extraction liquid is desirably maintained at a temperature about 5° to 30° C. higher than the shaping temperature, but substantially below the boiling point of the extraction liquid and of the volatile content of the pore former, e.g., at 75° C. or 80° C. Thus, when water forms the volatilecontent of the pore former, bath temperatures approaching 100° C. should be avoided when operating at atmospheric pressure, as at such excessive temperatures, water vapor is liberated in the plastic sheet and tends to "blow out" therefrom, causing the formation of macropores of undesirably large diameters instead of the desired micropore system. On the other hand, of course, the use of a suitable elevated bath temperature has the advantage of accelerating the extraction of the plasticizing solvent. If this temperature approaches the softening point of the resin used, it may be desirable to support the plastic sheet in the extraction bath on an appropriate support such as a conveyor belt to avoid unwanted deformation.

By maintaining the extraction bath at such an elevated temperature, strains which may have previously developed in the doughy sheet are relaxed and the primary solvent is replaced therein with the secondary solvent without introducing any new stresses, thereby minimizing shrinkage and maximizing ultimate porosity. It should be understood that, depending on the amount of solvent, the dry volume of the thermoplastic resin used to form the sheet may swell greatly when it is solvated or transformed into a gel upon mixing with the plasticizing solvent; and that stresses may develop in the sheet when it is mechanically formed from the resulting gel and particularly if the solvent is then evaporated from the shaped dough mass. These stresses then tend to cause unwanted shrinkage of the sheet and thereby diminish its porosity.

In the present invention, shrinkage is minimized and the desired microporosity is produced and maintained. This is achieved here because as the primary solvent is extracted from the plastic sheet, it is largely replaced in the sheet by the extraction liquid. For instance, though the organic solent in a typical embodiment may constitute 20 to 30% by volume of the dough, upon its removal by extraction of the extruded plastic sheet in accordance with this invention, the total volume of the sheet will shrink relatively little, usually about 5% or less. Thus, unlike in the case of solvent removal by evaporation, the removal of the primary solvent according to the present invention does not leave behind any substantial vacant volume for the deplasticized resinous matter to shrink into. Instead, it produces a dimensionally stable, deplasticized resinous matrix which contains a substantial proportion of non-solvating liquid and in which the desired system of micropores can thereafter be developed by drying out its liquid content and by driving off the volatile content of the pore forming substance which is dispersed in or held together by the resin.

In preparing the doughy mass, it is most convenient to blend the dry pulverulent resin and particles of pore former in a dry mixer. Thus, for instance, 1 part of polyvinyl chloride can be mixed with 10 to 12 parts of silica hydrogel particles containing 50 to 75% water. After a homogeneous pulverulent mixture is obtained, a solvent for the resin, e.g., cyclohexanone when polyvinyl chloride is used, is added in an amount sufficient to form a kneadable, coherent dough that is capable of being formed into a sheet of desired thickness, e.g., 0.001 to 1.5 mm., preferably about 0.6 to 0.7 mm., by extrusion, calendering, or other suitable method. The resulting sheet is then directly introduced into an extraction liquid which is capable of extracting the primary solvent from the formed sheet and which replaces the primary solvent in the sheet without appreciable dissolving or swelling the resin in the sheet. When the primary solvent has been substantially completely extracted from the sheet, and the latter has thus been deplasticized and made dimensionally quite stable, the extraction liquid is removed from the sheet be evaporative drying.

Ultimately, the desired microporosity is created in the sheet by heating it at a temperature at which the pore former shrinks in volume due to release of its volatile content or other partial or total decomposition. For instance, when silica hydrogel is used as the pore former, its desired dehydration and shrinkage within the plastic sheet and the consequent formation of micropores can be achieved by passing the deplasticized sheet including the pore former through a dry air oven maintained at a temperature between about 65° and 150° C. Quite high air temperatures may be maintained if the plastic sheet which is being dried or in which the microporesare being created is pased through the oven at a rapid rate, particularly when evaporation of substantial quantities of water or other liquid from the sheet prevent the temperature of the latter from exceeding the boiling point of the liquid being evaporated. However, the heating conditions should preferably be such as to avoid raising the temperature of the sheet itself substantially above the softening point of the resin of which the sheet is essentially composed, i.e., in the case of a shet made from a typical PVC resin, the sheet temperature should desirably be kept at not more than about 100° C., and preferably below about 95° C. When the desired micropore structure has been created, the sheet can be cut to the desired size or configuration, preferably after it is cooled to room temperature.

The invention may be better understood by reference to the drawings wherein:

FIG. 1 is a schematic representation of an apparatus suitable for practicing the process of the present invention. The apparatus includes an extruder, calender rolls, and other equipment; and FIG. 2 is an enlarged, sectional, isometric view of the extruder and calender rolls of FIG. 1.

Referring now to the drawings, and in particular to FIG. 1, there is shown an apparatus 10 suitable for practicing the process of the present invention. The apparatus 10 comprises an extruder 11 having an inlet funnel 12 and a head 13 containing an outlet orifice 14. Immediately beneath the extruder 11 are two oppositely rotating calender rolls 15 and 16. Beneath the rolls 15 and 16 is a tank 17 adapted to hold an extraction bath 18.

The apparatus 10 further comprises an oven 20 having a foraminous screen 21 adapted to carry material through the oven 20 over idler rolls 22 and 23. The apparatus 10 further comprises a knife 24 adapted to cut the battery separator sheet to any convenient length.

In operation, the above described dough is produced by mixing the selected ingredients placed in the inlet 12, whereupon it issues from the outlet 14 as extrudate in the form of a sheet 25. The sheet 25 passes between the nip of the rolls 15, 16 and into the bath 18. The bath 18 is composed of a liquid which extracts the first solvent from the sheet 25. The sheet 25 then leaves the bath 18, passes over idler roller 26, and enters the oven 20. In the oven 20, the sheet is heated at an elevated temperature which is, however, below the softening point of the resin contained in the sheet. This heating is continued until the filler is shrunk within the sheet by release of its volatilizable content. The sheet 25 then leaves the oven 20 and is cut to any convenient length by the knife 24.

Several important relationships between the extruder 11, the rolls 15 and 16, and the sheet 25 are illustrated in FIG. 2. Referring now to FIG. 2, it can be seen that the rolls 15, 16 rotate in opposite directions as indicated by arrows 27, 28. The rolls 15, 16 rotate at the same rate of speed. This rate of speed is adjusted, together with the rate of speed of the screw 29, such that the extrudate 30 does not build up in the nip of the rolls 15 and 16, and such that the linear speed of the surface of the rolls 15, 16 is equal to the linear speed of the sheet 25. This is to eliminate undesirable surface effects that would be caused by unequal rates of speed. The axis 31 of rotation of the roll 15 is parallel to the axis 32 of rotation of the roll 16. Thus, the axes 31, 32 define a plane 33. In the preferred embodiment shown, the plane 33 is horizontal thus insuring that the sheet 25 will be vertical. This is important because of the limited dimensional stability exhibited by the sheet 25 prior to the time it enters the bath 18. In less preferred embodiments of the present invention, the plane 33 can be vertical or inclined relative to the surface of bath 18.

The outlet 14 of the extruder head 13 is positioned at a point between the plane 33 and a plane 34 defined by the upper surfaces of each of the rolls 15, 16. The speed of rotation of the screw 29, the viscosity of the dough, and the size of the orifice 14 and other parameters are all adjusted according to rules well known in the art in order to produce a pressure in the extruder head measured between the lower end of the screw 29 and the outlet 14 of between 100 and 1,000 psig, and preferably between 200 and 500 psig. This pressure is most conveniently measured by a gauge 35.

The relationship between the thickness of the extrudate 30 and the distance between the rolls 15, 16 at their nip is critical to optimum performance of the process of the present invention. The distance $t_1$ between the surface of the rolls 15, 16 measured at the nip is between 0.001 and 1.5 mm., and preferably between 0.1 and 1.0 mm. The thickness $t_2$ of the extrudate 30 is equal to 1.1 to 1.8 times $t_1$.

The roll 15 can also be provided with one or more circumferential grooves 36, which causes a predetermined deformation of the extrudate 30, producing on the sheet 25 a series of corresponding ribs 37, 38, 39. Of course, the number of grooves 36 corresponds to the number and placing of the ribs, although in FIG. 2 only one groove is shown for the sake of simplicity.

The extractive removal of the solvent by the process of the present invention represents an important advance and a distinction when compared to the evaporative removal previously taught by Witt et al. By use of this extractive removal, deformation blisters and other undesirable effects are avoided especially when the present process is employed in combination with the extrusion of the dough directly into the nip of two rotating rolls.

Extrusion directly into the nip of two rotating rolls is important in order to reduce to an absolute minimum the evaporation of solvent or plasticizer from the dough. If the orifice 14 of the extruder 11 is placed at a greater distance from the nip of the rolls 15, 16, then undesirable evaporation of the solvent occurs with an undesirable deformation of the extrudate 30, causing undesirable surface effects in the resultant sheet 25.

EXAMPLE 1

One part powdered polyvinyl chloride resin is mixed dry with 12 parts powdered silica hydrogel (73% water content) until the mixture is homogeneous, whereupon 4 parts cyclohexanone is added to the mixed powdered solids. As those skilled in the art will readily understand, the optimum proportion of organic solvent used in making up a dough of the proper consistency is somewhat dependent on the specific characteristics of the resin and solvent used as well as on water which may be present in the mixture and which may tend to weaken the solvent power or plasticizing effect of the organic solvent. Thus, for instance, in this specific example, the solvent requirement was 1 part cyclohexanone per part of polyvinyl chloride plus 0.25 part cyclohexanone per part of the silica hydrogel which contained 73% water. Less cyclohexanone is needed if a silica gel of lower water content is used, but in this event less filler shrinkage and hence less porosity is ultimately developed in the plastic sheet.

In making up the dry mixture, the resin powder is preferably sifted to remove large particles. The sifting is done, for example, through a 100 mesh screen, i.e., through a screen having openings about 0.15 mm. wide, directly into the mixer, and the silica gel is thereafter sifted through a screen of the same mesh directly into the mixer where a dry homogeneous mixture is formed. Thereafter 4 parts of cyclohexanone is added and the mixing is continued at room temperature for a period of about 3 to 10 minutes or until homogeneity is obtained. Thereupon, the temperature is gradually raised under continued mixing to about 70° C. and after this temperature has been reached, the mixing continues for an addition 5 minutes until a substantially homogeneous dough is obtained.

Next, the warm dough is extruded in an otherwise conventional manner to form a flat band or sheet approximately 0.6 to 0.7 mm. thick and as wide as desired, e.g., 25 cm. wide. Immediately after its formation, the band is then introduced into a water bath maintained at about 80° C. and serving as the extracting liquid, it being important that no significant amount of solvent evaporates from the band in the interval between its formation and its introduction into the extraction bath. While different extraction bath temperatures may be used, it is preferred to use temperatures above about 50° C. in order to accelerate the extraction process. On the other hand, it is important to keep the extraction bath temperature substantially below the point at which vapors or gases are generated or released within the plastic sheet, either from the filler or from the liquid solvent composition. Accordingly, when using a water-containing pore former such as silica hydrogel and when operating at atmospheric pressure, it is desirable to maintain the extraction bath at a temperature below 100° C. and preferably below about 90° C. Sudden release of any substantial volume of vapor or gas in the plastic sheet is undesirable in that it tends to "explode" the sheet and create large channels or macropores therein in place of the desired micropores.

The organic solvent content of the extraction bath is preferably kept as low as possible by known methods, for example, by periodic distillation of the extraction bath or by continuous removal of a portion of the extraction bath to a distillation column and return of the water back to the bath after the organic solvent has been stripped therefrom. With a band thickness of 0.6 to 0.7 mm., substantially complete extraction of the organic solvent can be achieved in water in about 35 to 40 minutes at a bath temperature of 80° C. However, a minor proportion of ethanol in the water bath can be used to shorten the extraction time of cyclohexanone, the inclusion of about 20% ethanol in the water bath serving to shorten the extraction time by about 25% as compared to the use of a plain water bath.

As the extraction of the organic solvent from the plastic sheet progresses, the organic solvent becomes largely replaced therein by water and the plastic thus becomes deplasticized and rigid. For instance, whereas cyclohexanone originally constituted about 25% by volume of the extruded sheet, its essentially complete removal from the sheet in accordance with the present invention results in the sheet shrinking only about 5% or less in volume.

When the plastic band or sheet has become practically free from solvent, it sets up into a stiff or dimensionally stable product which is then dried and heated to remove water or other extraction solvent and ultimately cause the desired pore system to form in the product by dehydration or decomposition of the pore former dispersed therein. For instance, in the specific embodiment described in this example, the extracted sheet may be passed through an air oven wherein the air temperature may gradually decrease in the oven from well above 100° C., e.g., 150° C., at the sheet entrance to under 100° C., e.g., about 90°-95° C. in the later drying stages. Relatively high oven temperatures can be tolerated in the early stages of the drying process because evaporation of water from the sheet automatically keeps the sheet temperature from exceeding 100° C. However, in the later stages, when most of the water is gone from the sheet, it is advantageous to reduce the air temperature below the softening point of the polyvinyl chloride or other resin used in making the sheet. In these later stages, the silica hydrogel or equivalent pore former is dehydrated and shrunk such that its remaining solid residue separates from the resinous matrix and thus forms the desired fissures or pores therein. Excessive softening of the resin at this stage is undesirable in that it may cause the resin to flow and thus close or reduce the pores which have been formed therein.

EXAMPLE 2

One part powdered polyvinyl chloride resin is mixed with 5 parts silica hydrogel containing 70% water and with 2.3 parts cyclohexanone to form a dough, and the latter extruded through a suitable die to form a thin band, all substantially as described in Example 1. The band is extruded directly into a tank containing water at room temperature. At room temperature, cyclohexanone is soluble in water in the proportion of about 8 to 10 parts per hundred.

The extruded band is then transferred to another water bath wherein the temperature is raised to about 100° C., or just under the boiling point of water. Since at this temperature the solubility of cyclohexanone in water is less than at room temperature, it is exchanged in the plastic band or sheet for more water while substantially maintaining the volume or porosity of the plastic compositon. Internal stresses in the processed material tend to be released in the hot bath. Thereafter, the extracted and consequently rigid plastic band is dried and micropores formed therein by controlled heating, as in Example 1. Finally, the band is cut into sheets of the desired size for use as battery separators.

The invention is particularly pointed out in the appended claims. However, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A process for producing a microporous storage battery separator which comprises:
   (a) forming a mixture of a vinyl chloride resin, a plasticizing amount of a first solvent and finely divided particles of a filler which contains a volatilizable constituent releasable therefrom by heating and which shrinks substantially and irreversibly upon release of said volatilizable constituent therefrom;
   (b) forming said mixture into a shaped continuous member without substantial evaporation of the solvent from the mixture by extruding the mixture directly into the nip of two oppositely rotating rolls wherein the outlet of the extruder head is positioned at a point between the plane containing the axes of rotation of the rolls and a plane defined by the upper surface of each of the rolls;
   (c) immediately introducing said shaped continuous member into a liquid bath of a second solvent at a temperature substantially below the boiling point of any liquid present to extract said first solvent from said continuous member before any substantial evaporation of the said first solvent occurs, said second solvent being one which is capable of extracting said first solvent from said shaped continuous member without dissolving said resin and said filler, thereby deplasticizing said member by extractively removing said first solvent from said member; and
   (d) thereafter heating said member at an elevated temperature but below the softening point of the resin contained therein until said filler is shrunk within the member by release of its volatilizable content.

2. The process of claim 1 wherein the rolls are rotating in opposite directions at the same rate of speed.

3. The process of claim 1 wherein the linear speed of the surface of the rolls is equal to the linear speed of the extrudate.

4. The process of claim 1 wherein the axes of rotation of the rolls both lie in a single horizontal plane.

5. The process of claim 1 wherein the extruder has at least one rotatable screw and the pressure in the extruder head measured between the lower end of the screw and the outlet of the extruder head is between 100 and 1000 psig.

6. The process of claim 1 wherein the rolls are positioned above but barely out of contact with the surface of the liquid extraction bath.

7. The process of claim 1 wherein the distance between the surfaces of the rolls measured at the nip is between 0.001 mm and 1.5 mm.

8. The process of claim 1 wherein the thickness of the extrudate is equal to 1.1 to 1.8 times the distance between the surfaces of the rolls measured at the nip.

9. A storage battery separator produced by the process of claim 1.

10. In a process for producing a microporous member by forming a mixture of a vinyl chloride resin, a plasticizing amount of a first solvent and finely divided particles of a filler which contains volatilizable constituent releasable therefrom by heating and which shrinks substantially and irreversibly upon release of said volatilizable constituent therefrom into a shaped member, introducing said shaped member into a liquid bath of a second solvent to extract said first solvent from said member, said second solvent being one which is capable of extracting said first solvent from said shaped member without dissolving said resin and said filler, thereby deplasticizing said member by extractively removing said first solvent from said member, and thereafter heating said member at an elevated temperature but below the softening point of the resin contained therein until said filler is shrunk within the member by release of its volatilizable content, the improvement which comprises forming said mixture into a shaped continuous member by extruding the mixture directly into the nip of two oppositely rotating rolls whereby undesirable evaporation of the solvent is substantially avoided and immediately introducing said shaped continuous member into the liquid bath of said second solvent, said bath being at a temperature substantially below the boiling point of any liquid present, to extract said first solvent from said continuous member before any substantial evaporation of said first solvent occurs.

* * * * *